(12) United States Patent
Terao (10) Patent No.: US 7,952,463 B2
(45) Date of Patent: May 31, 2011

(54) VEHICLE SECURITY SYSTEM

(75) Inventor: Iichirou Terao, Kariya (JP)

(73) Assignee: DENSO CORPORATION, Kariya (JP)

( * ) Notice: Subject to any disclaimer, the term of this patent is extended or adjusted under 35 U.S.C. 154(b) by 1057 days.

(21) Appl. No.: 11/797,911

(22) Filed: May 8, 2007

(65) Prior Publication Data

US 2008/0030301 A1 Feb. 7, 2008

(30) Foreign Application Priority Data

May 10, 2006 (JP) .................................. 2006-131600

(51) Int. Cl.
*G08B 13/00* (2006.01)
(52) U.S. Cl. ..................... 340/5.53; 340/5.83; 307/10.4; 382/124
(58) Field of Classification Search .................. 340/5.53, 340/5.83, 5.72, 426.11, 426.12; 307/10.7, 307/10.4; 382/124; 701/200, 211
See application file for complete search history.

(56) References Cited

U.S. PATENT DOCUMENTS 5,938,706 A * 8/1999 Feldman ........................ 701/32
2002/0044065 A1 * 4/2002 Quist et al. .................. 340/815.4
2002/0048391 A1 * 4/2002 Kim .............................. 382/124
2006/0104493 A1 * 5/2006 Hsieh et al. ................... 382/125

FOREIGN PATENT DOCUMENTS

| JP | A-H06-72291 | 3/1994 |
| JP | A-H10-287209 | 10/1998 |
| JP | A-2000-309247 | 11/2000 |
| JP | A-2001-63525 | 3/2001 |
| JP | A-2003-25960 | 1/2003 |
| JP | 2003-72520 | 3/2003 |
| JP | A-2004-276798 | 10/2004 |

* cited by examiner

*Primary Examiner* — Edwin C Holloway, III
(74) *Attorney, Agent, or Firm* — Posz Law Group, PLC (57) ABSTRACT

A vehicle security system includes a screen for displaying a message, a fingerprint reader provided to the screen to detect a fingerprint of a driver touching the screen with a finger, a switch having a first state for allowing engine start of a vehicle and a second state for prohibiting the engine start, and a controller for keeping the switch in the second state until receiving the fingerprint from the reader and for changing the switch to the first state upon receiving the fingerprint from the reader. The reader can detect the fingerprint of the driver without being noticed by the driver, because the message leads the driver to unquestioningly touch the screen with the finger. Even if the vehicle is stolen by the driver, the driver is identified by the detected fingerprint so that a chance of catching the driver can be increased.

14 Claims, 7 Drawing Sheets

VEHICLE SECURITY SYSTEM

CROSS REFERENCE TO RELATED APPLICATION

This application is based on and incorporates herein by reference Japanese Patent Application No. 2006-131600 filed on May 10, 2006.

FIELD OF THE INVENTION

The present invention relates to a vehicle security system for identifying a thief who drives a stolen vehicle.

BACKGROUND OF THE INVENTION

A conventional vehicle security system operates in a manner outlined below to provide security against vehicle theft. The security system monitors shock caused when a door of a vehicle is opened or closed by a thief. When the security system detects the shock, the security system sends an alarm to a security center. Also, the security system captures an image of the interior of the vehicle using a camera attached to the ceiling of the vehicle and sends the image data to the security center. Thus, the thief is identified by the image data. However, the security system cannot identify the thief, if the shock is not caused or the camera is covered with something and blinded As disclosed in, for example, JP-A-2001-63525, a vehicle security system has been developed that includes a fingerprint reader. Using the fingerprint reader, the security system obtains a fingerprint of a driver and sends the fingerprint data to the security center. The security center verifies the driver's fingerprint data against an authorized user's fingerprint data. The security center allows the engine to be started only when the driver's fingerprint data matches the authorized user's fingerprint data. In such a security system, the driver intentionally puts his/her finger on the fingerprint reader and the fingerprint reader obtains the fingerprint of the finger put thereon. A thief may avoid putting his/her finger on the fingerprint reader and start the engine of the vehicle in an illegal way, for example, by directly coupling an engine starter to the engine. Therefore, there may be fear that the security system cannot obtain a fingerprint of the thief and cannot identify the thief.

SUMMARY OF THE INVENTION

In view of the above-described problem, it is an object of the present invention to provide a vehicle security system for providing security against vehicle theft by detecting a biometric characteristic of a driver without being noticed by the driver.

A security system for a vehicle includes a screen for displaying a message, a reader for detecting a biometric characteristic of a finger touching the screen and for outputting biometric data corresponding to the detected biometric characteristic, a switch having a first state for allowing operation (e.g., engine start) of the vehicle and a second state for prohibiting the operation of the vehicle, and a controller for keeping the switch in the second state until receiving the biometric data from the reader and for changing the switch to the first state upon receiving the biometric data from the reader. For example, the biometric characteristic is a fingerprint or a finger vein.

The message displayed on the screen leads to a driver of the vehicle to unquestioningly touch the screen with a finger. For example, the screen is a screen of a monitor of a vehicle navigation system, and the message says, in terms of product liability law, "This navigation system may have a distance error. Please touch here, if you accept the error". In such an approach, the reader can detect the biometric characteristic of the driver without being noticed by the driver. In such an approach, even if the vehicle is stolen, a thief is identified by the detected biometric characteristic so that a chance of catching the thief can be increased. Thus, the vehicle security system provides security against vehicle theft.

Further, the controller keeps the switch in the second state until receiving the biometric data from the reader. When the driver does not touch the screen and consequently the reader cannot detect the biometric characteristic of the driver, the engine of the vehicle cannot be started. In such an approach, the vehicle security system prevents the vehicle from being stolen, when the biometric characteristic of the driver is not detected. Thus, the vehicle security system provides the security against the vehicle theft.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
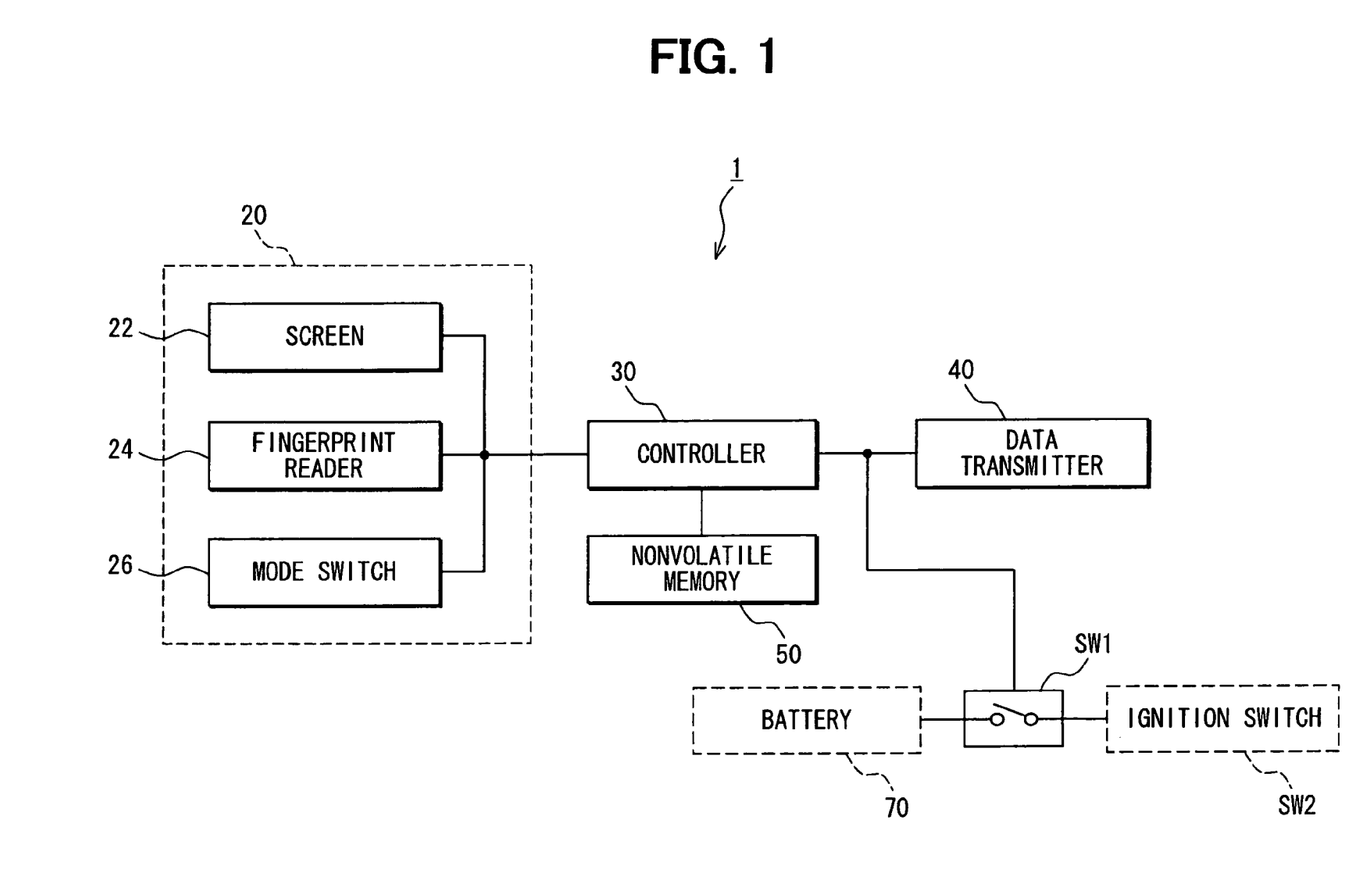
FIG. 1 is a schematic block diagram of a vehicle security system according to a first embodiment of the present invention.

As shown in FIG. 1, a vehicle security system 1 according to a first embodiment of the present invention includes a monitor 20, a controller 30, a data transmitter 40, a nonvolatile memory 50, and an interruption switch SW1.

The monitor 20 includes a display screen 22, a fingerprint reader 24, and a mode switch 26. The screen 22 displays various information to a driver and passengers of a vehicle. For example, the monitor 20 is a monitor of a vehicle navigation system and the screen 22 is a cathode-ray tube (CRT) or a liquid crystal display (LCD) panel.

The fingerprint reader 24 includes a pressure-sensitive touch sensor (not shown) and an output circuit (not shown). The touch sensor is placed approximately in the center of the screen 22 to occupy a predetermined region 22A of the screen 22. The touch sensor detects a fingerprint of a person who touches the region 22A of the screen 22. The output circuit converts the detected fingerprint to first fingerprint data and outputs the first fingerprint data to the controller 30. The fingerprint reader 24 has an enable mode and a disable mode. The fingerprint reader 24 works in the enable mode and does not work in the disable mode. Therefore, the fingerprint reader 24 consumes power in the enable mode and does not consume power in the disable mode.

Figure 2:
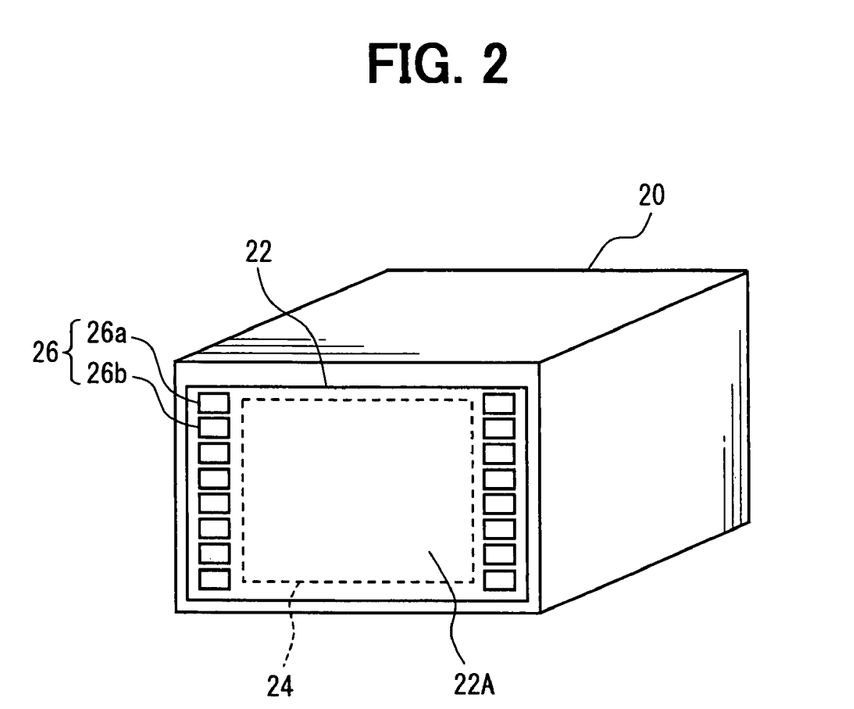
FIG. 2 is a perspective view of a monitor of the security system of FIG. 1.

During the operation of the monitor 20, multiple pressure-sensitive switches for controlling functions of the vehicle appear on the screen 22 except the region 22A. The pressure-sensitive switches include the mode switch 26. The mode switch 26 is used to switch the fingerprint reader 24 between the enable mode and the disable mode. For example, as shown in FIG. 2, the mode switch 26 appears on the left top corner of the screen 22.

The mode switch 26 includes an enable switch 26a and a disable switch 26b. When the enable switch 26a is touched or pressed with a finger, the enable switch 26a outputs an enable command to the controller 30. The controller 30 switches the fingerprint reader 24 to the enable mode in response to the enable command. In contrast, when the disable switch 26b is touched or pressed with the finger, the disable switch 26b outputs a disable command to the controller 30. The controller 30 switches the fingerprint reader 24 to the disable mode in response to the disable command.

The data transmitter 40 includes a transmitter (not shown) and an antenna (not shown). The data transmitter 40 receives the first fingerprint data from the controller 30. When a predetermined condition is met, the data transmitter 40 transmits the first fingerprint data to a predetermined destination such as a police station, or a security company the driver or owner of the vehicle contracts with.

The first fingerprint data is stored in the nonvolatile memory 50. For example, the nonvolatile memory 50 is a flash memory such as a memory stick, a hard disk drive, or the like.

The interruption switch SW1 is provided between a battery 70 and an ignition switch SW2 of the vehicle. The controller 30 controls the interruption switch SW1. When the interruption switch SW1 is turned on, the battery 70 supplies power to the ignition switch SW2 so that the ignition switch SW2 can start an engine of the vehicle.

The controller 30 includes a central processing unit (CPU), a read only memory (ROM), a random access memory (RAM), and an input/output (I/O) interface, and the like, which are not shown in the drawings.

Figure 3:
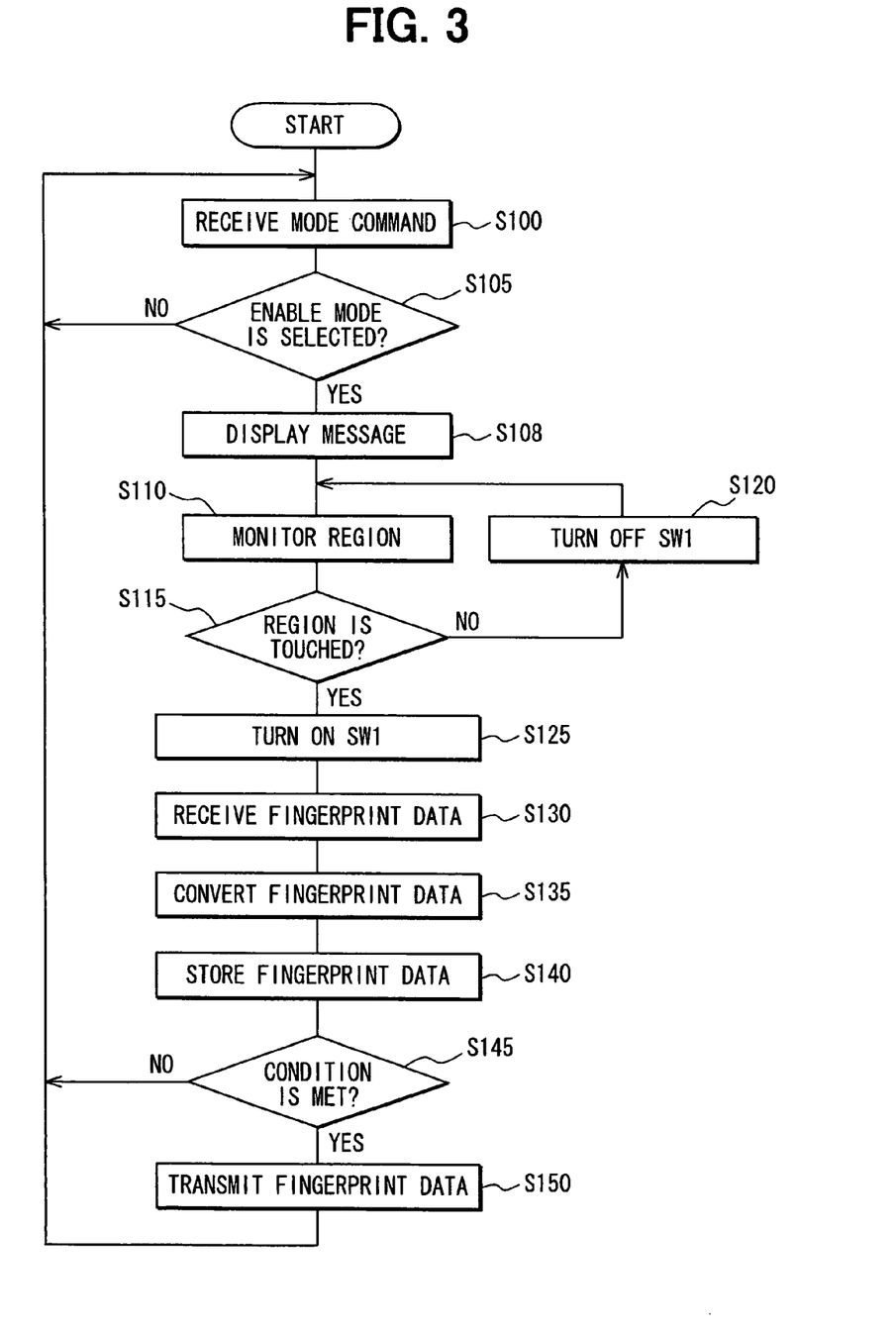
FIG. 3 is a flow chart illustrating processes performed by a controller of the security system of FIG. 1.

The controller 30 operates as shown in the flow chart of FIG. 3. The controller 30 starts from step S100 where the controller 30 receives a mode command from the mode switch 26. The mode command is the enable command or the disable command.

Then, the controller 30 proceeds to step S105 where the controller 30 determines which of the enable command and the disable command is received at step S100. If the controller 30 determines that the disable command is received at step S100, the controller 30 returns to step S100. In contrast, if the controller 30 determines that the enable command is received at step S100 so that the enable mode is selected, the controller 30 proceeds to step S108.

At step S108, the controller 30 causes to the screen 22 of the monitor 20 to display a predetermined message on the region 22A. The message is displayed, before the engine of the vehicle is started, for example, when the driver opens a door of the vehicle. The message leads the driver to unquestioningly touch the region 22A of the screen 22. For example, in terms of product liability law, the message says, "This navigation system may have a distance error. Please touch here, if you accept the error".

Then, the controller 30 proceeds to step S110 where the controller 30 receives a status signal from the fingerprint reader 24. The status signal represents status of the region 22A. The controller 30 monitors the region 22A based on the status signal.

Then, the controller 30 proceeds to step S115 where the controller 30 determines whether the driver touches or presses the region 22A with a finger. If the controller 30 determines that the driver does not touch or press the region 22A, the controller 30 proceeds to step S120 and returns to step S110. At the step S120, the controller 30 turns off the interruption switch SW1 to disconnect the ignition switch SW2 from the battery 70. Thus, the interruption switch SW1 interrupts the power supply to the ignition switch SW2 so that the driver cannot start the engine of the vehicle. In contrast, if the controller 30 determines that the driver touches or presses the region 22A, the controller 30 proceeds to step S125. At the step S125, the controller 30 turns on the interruption switch SW1 to connect the ignition switch SW2 and the battery 70. Thus, the interruption switch SW1 allows the power supply to the ignition switch SW2 so that the driver can start the engine of the vehicle.

After step S125, the controller 30 proceeds to step S130 where the controller 30 receives the first fingerprint data from the fingerprint reader 24.

Then, the controller 30 proceeds to step S135 where the controller 30 converts the first fingerprint data to second fingerprint data having a data format used in a predetermined fingerprint matching process, which has been developed or will be developed. For example, the fingerprint matching process uses a one-dimensional thermal sensor or a two-dimensional image sensor.

Then, the controller 30 proceeds to step S140 where the controller 30 stores the first and second fingerprint data in the nonvolatile memory 50.

Then, the controller 30 proceeds to step S145 where the controller 30 determines whether the predetermined condition for transmitting the first and second fingerprint data is met. For example, the nonvolatile memory 50 has a predetermined upper limit above which the first and second fingerprint data cannot be stored in the nonvolatile memory 50. When the total amount of the first and second fingerprint data stored in the nonvolatile memory 50 exceeds the upper limit, the predetermined condition for transmitting the first and second fingerprint data is met. At step S145, if the controller 30 determines that the predetermined condition is not met, the controller 30 returns to step S100. In contrast, if the controller 30 determines that the predetermined condition is met, the controller 30 proceeds to step S150.

At step S150, the controller 30 causes the nonvolatile memory 50 to output the excess of the first and second fingerprint data over the upper limit to the data transmitter 40 in a last-in first-out (LIFO) manner, for example. The data transmitter 40 receives and transmits the excess to the predetermined destination. Then, the controller 30 returns to S100 and repeats the same processes.

In the vehicle security system 1 according to the first embodiment, the message is displayed on the region 22A of the screen 22, before the engine of the vehicle is started. The message leads to the driver to unquestioningly touch or press the region 22A of the screen 22. For example, in terms of product liability law, the message says, "This navigation system may have a distance error. Please touch here, if you accept the error". Until the driver touches or presses the region 22A of the screen 22, the engine cannot be started. The fingerprint reader 24 detects the fingerprint of the driver touching the region 22A. Thus, whenever the engine of the vehicle is started, the fingerprint reader 24 detects the fingerprint of the driver without being noticed by the driver.

The first and second fingerprint data are transmitted to the predetermined destination such as the police station or the security company. The police station or the security company checks whether the driver is authorized to drive the vehicle based on the first and second fingerprint data. In such an approach, even if the vehicle is stolen, a thief is identified by the first and second fingerprint data. Thus, the vehicle security system 1 provides security of the vehicle against theft.

The fingerprint reader 24 has the enable mode and the disable mode. The fingerprint reader 24 works in the enable mode and does not work in the disable mode. Therefore, while the fingerprint reader 24 consumes power in the enable mode, the fingerprint reader 24 does not consume power in the disable mode. For example, when the vehicle is parked in a safe place such as a locked garage, the fingerprint reader 24 is switched to the disable mode. In such an approach, the power consumption of the battery 70 before the start of the engine can be reduced.

The mode switch 26 is provided on the screen 22. The mode switch 26 can be used for controlling other functions of the vehicle. Therefore, the functions of the vehicle can be controlled on the screen 22 in a unified way. Thus, the vehicle security system 1 offers convenience to the driver.

The first and second fingerprint data are stored in the nonvolatile memory 50. The first and second fingerprint data remain stored in the nonvolatile memory 50, even when the thief removes the battery 70 from the vehicle. Therefore, the thief is identified by the first and second fingerprint data stored in the nonvolatile memory 50 so that the vehicle security system 1 provides the security of the vehicle against the theft.

The controller 30 converts the first fingerprint data received from the fingerprint reader 24 to the second fingerprint data having the data format used in the predetermined fingerprint matching process. In such an approach, the fingerprint matching process can be easily performed and completed within a reduced time. If the fingerprint mating process uses only a portion of the first fingerprint data, the size of the second fingerprint data can be smaller than that of the first fingerprint data. Therefore, the RAM and the nonvolatile memory 50 can be reduced in capacity.

The data transmitter 40 transmits the first and second fingerprint data to the predetermined destination where the fingerprint matching process is performed. In short, the vehicle security system 1 does not perform the fingerprint matching process. Generally, the fingerprint matching process requires complex computations. The vehicle security system 1 can be simplified in structure by performing the fingerprint matching process outside the vehicle security system 1. Accordingly, the vehicle security system 1 can be reduced in size and weight. Further, power consumed in the vehicle security system 1 can be reduced.

The first and second fingerprint data are transmitted when the predetermined condition is met. This approach reduces the number of transmission processes, which consume much power. Thus, the power consumed in the vehicle security system 1 can be reduced.

Second Embodiment

Figure 4:
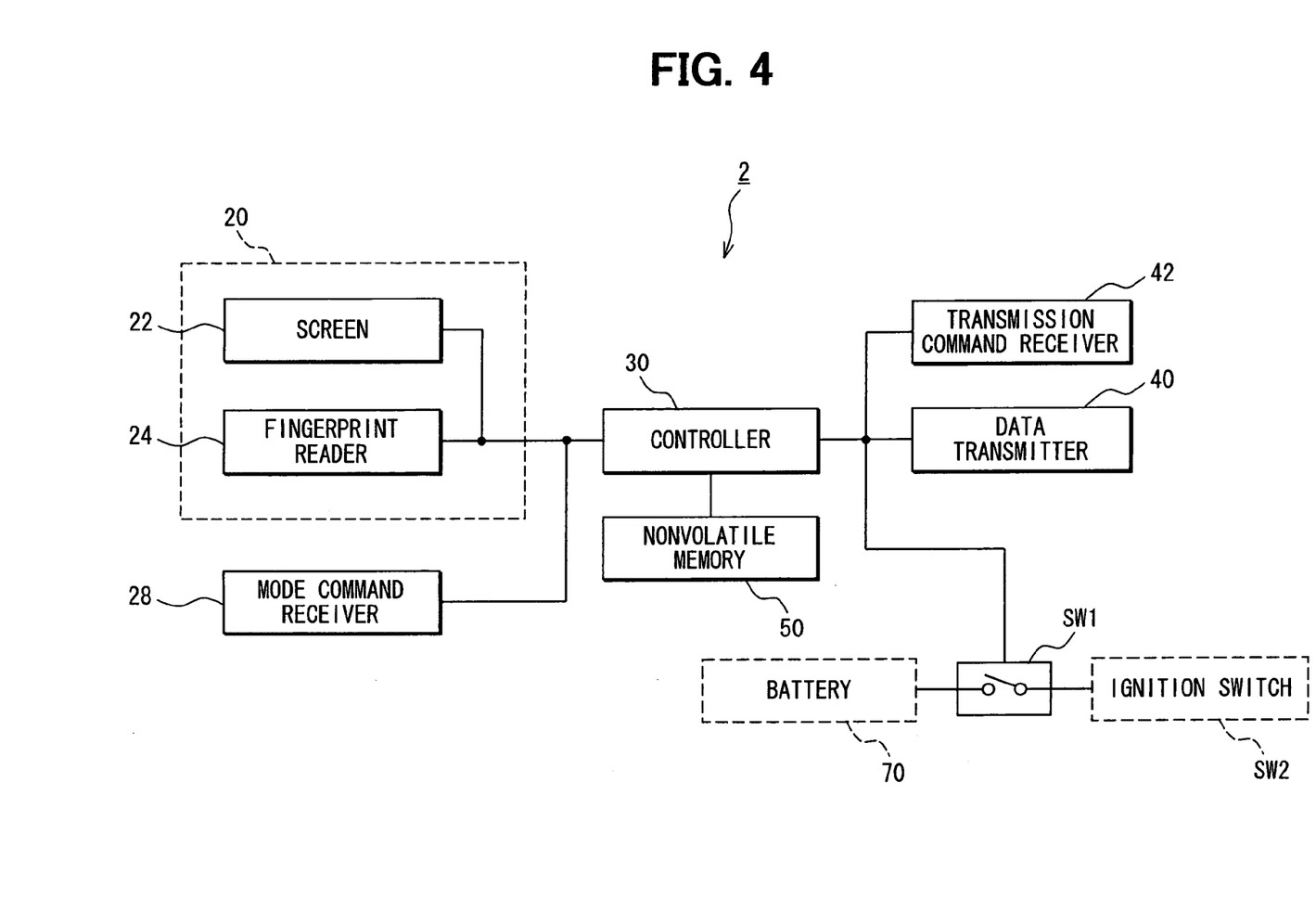
FIG. 4 is a schematic block diagram of a vehicle security system according to a second embodiment of the present invention.

As shown in FIG. 4, a vehicle security system 2 according to a second embodiment of the present invention includes a mode command receiver 28 and a transmission command receiver 42. The mode command receiver 28 and the transmission command receiver 42 of the vehicle security system 2 replace the mode switch 26 of the vehicle security system 1. In the second embodiment, the mode command used for switching the fingerprint reader 24 between the enable and disable modes is provided from outside the vehicle.

The mode command receiver 28 receives the mode command and outputs the received mode command to the controller 30. For example, the mode command receiver 28 includes a receiver and an antenna, which are not shown in the drawings.

The transmission command receiver 42 receives a transmission command that is provided from outside the vehicle and indicates which data needs to be transmitted from the vehicle security system 2. The transmission command receiver 42 outputs the received transmission command to the controller 30. If the transmission command indicates that the first and second fingerprint data need to be transmitted, the controller 30 causes the data transmitter 40 to transmit the first and second fingerprint data to the predetermined destination. For example, the transmission command receiver 42 includes a receiver and an antenna, which are not shown in the drawings.

Figure 5:
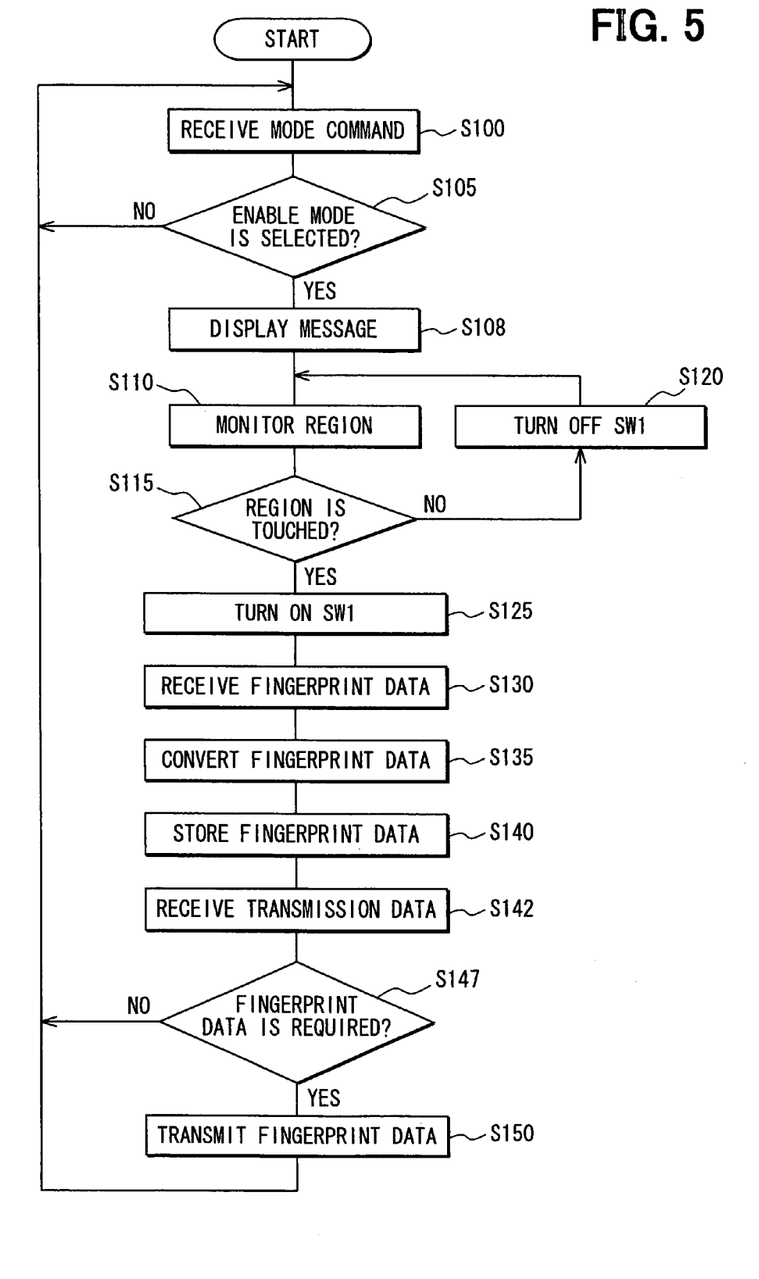
FIG. 5 is a flow chart illustrating processes performed by a controller of the security system of FIG. 4.

The controller 30 of the vehicle security system 2 operates as shown in the flow chart of FIG. 5. The controller 30 starts from step S100 where the controller 30 receives the mode command from the mode command receiver 28. Then, as with the first embodiment, the controller 30 performs steps S105-S140.

After step S140, the controller 30 proceeds to step 142 where the controller 30 receives the transmission command from the transmission command receiver 42.

Then, the controller 30 proceeds to step S147 where the controller 30 determines whether the received transmission command indicates that the first and second fingerprint data need to be transmitted. If the received transmission command indicates that other data need to be transmitted, the controller 30 returns to step S100. In contrast, if the received transmission command indicates that the first and second fingerprint data need to be transmitted, the controller 30 proceeds to step S150.

At step S150, the data transmitter 40 transmits the first and second fingerprint data to the predetermined destination. Then, the controller 30 returns to S100 and repeats the same processes.

In the vehicle security system 2 according to the second embodiment, the mode command used for switching the fingerprint reader 24 between the enable and disable modes is provided from outside the vehicle. The driver can set the fingerprint reader 24 to the enable mode even after getting off the vehicle. Thus, the vehicle security system 2 offers convenience to the driver.

Since the first and second fingerprint data can be transmitted by remote control, the police station or the security company can obtain the first and second fingerprint data as soon as possible after the vehicle is stolen. Therefore, the police station or the security company can identify the thief, before the thief finds that he or she is suspected. As a result, a chance of catching the thief is increased so that the security against the theft can be improved.

Third Embodiment

Figure 6:
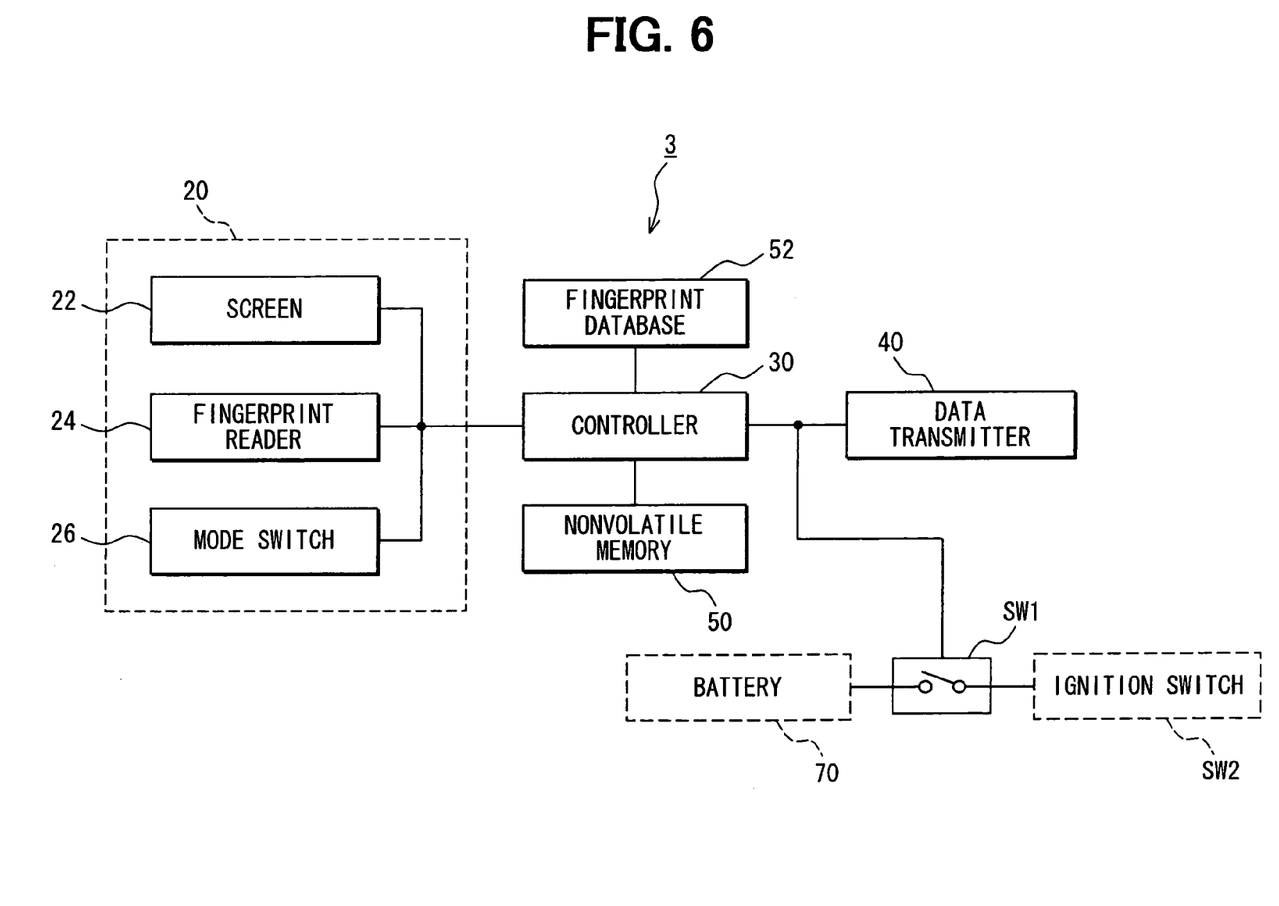
FIG. 6 is a schematic block diagram of a vehicle security system according to a third embodiment of the present invention.

As shown in FIG. 6, a vehicle security system 3 according to a third embodiment of the present invention further includes a fingerprint database 52, compared to the vehicle security system 1 of the first embodiment. The fingerprint database 52 contains a list of fingerprint data of drivers who are authorized to drive the vehicle.

Figure 7:
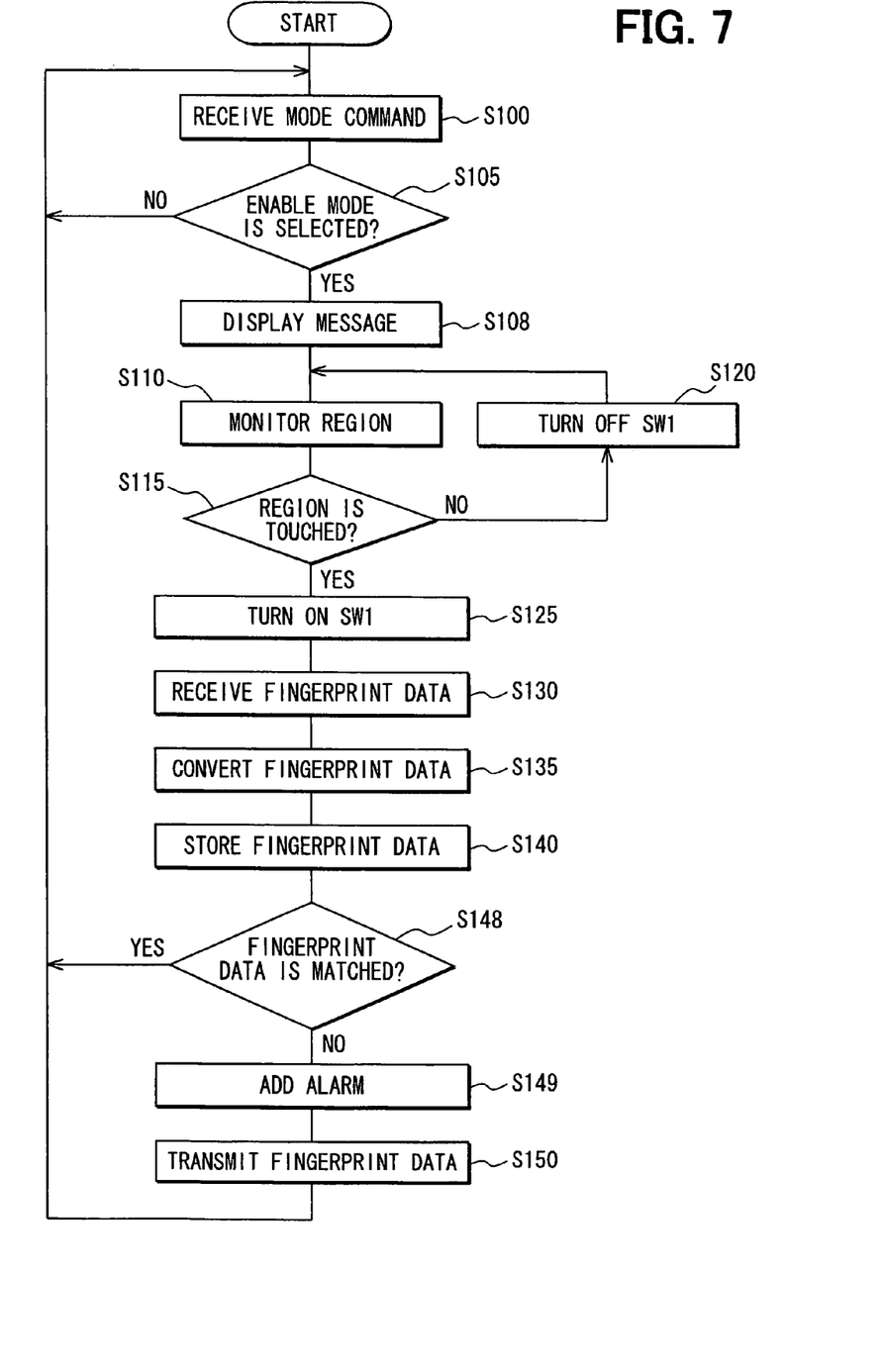
FIG. 7 is a flow chart illustrating processes performed by a controller of the security system of FIG. 6.

The controller 30 of the vehicle security system 3 operates as shown in the flow chart of FIG. 7. As with the first embodiment, the controller 30 performs steps S100-S140.

After step S140, the controller 30 proceeds to step 148 where the controller 30 determines whether the first (or second) fingerprint data is matched against the fingerprint database 52. If the first fingerprint data is matched, the controller 30 returns to step S100. In contrast, if the first fingerprint data is not matched against the fingerprint database 52, the controller 30 proceeds to step S149.

At step S149, the controller 30 adds an alarm message to the first fingerprint data. For example, the alarm message says, "A person driving a vehicle now is not registered in a fingerprint database."

Then, the controller 30 proceeds to step S150 where the data transmitter 40 transmits the first and second fingerprint data having the alarm message to the predetermined destination. Then, the controller 30 returns to S100 and repeats the same process.

In the vehicle security system 3 according to the third embodiment, the data transmitter 40 transmits the first and second fingerprint data, only when the first fingerprint data is not matched against the fingerprint database 52. This approach reduces the number of transmission processes and the length of transmission time. Thus, the power consumed in the vehicle security system 3 can be reduced.

Since the alarm massage is added to the first and second fingerprint data, the police station or the security company can recognize that the vehicle is stolen, without performing the fingerprint matching process. Thus, the police station or the security company can identify the thief as soon as possible after the vehicle is stolen. Therefore, the chance of catching the thief is increased so that the security against the theft can be improved.

MODIFICATIONS

The embodiments described above may be modified in various ways. For example, the screen 22 may be a screen of an air conditioner or an audio player mounted in the vehicle. In the case of the audio player, the message displayed on the screen 22 may say, "Please touch here to select a compact disk you listen to while driving." In the case of the air conditioner, the message displayed on the screen 22 may say, "Please touch here to adjust temperature in a vehicle."

The fingerprint reader 24 may be placed in a location where the driver necessarily or accidentally touches the fingerprint reader 24. For example, the fingerprint reader 24 may be mounted to a steering wheel, a shift lever knob, a push-button type switch (e.g., ignition switch), or a door handle of the vehicle.

The vehicle security systems 1-3 may use other biometric characteristic (e.g., finger vein) than the fingerprint to identify the thief. In this case, the fingerprint reader 24 is replaced with a reader that can detect the biometric characteristic.

The mode switch 26 may be a push-button type switch and may be placed near the screen 22.

In the embodiments described above, the data transmitter 40 transmits both the first and second fingerprint data to the predetermined destination. Alternatively, the data transmitter 40 may transmit only the second fingerprint data, because the size of the second fingerprint data is generally smaller than that of the first fingerprint data. In such an approach, the length of the transmission time can be reduced.

In the embodiments described above, the interruption switch SW1 controls the ignition switch SW2. Specifically, the interruption switch SW1 allows the ignition switch SW2 to start the engine of the vehicle, when the fingerprint reader 24 detects the fingerprint. Alternatively, the interruption switch SW1 may control a steering wheel lock of the vehicle. Specifically, the interruption switch SW1 may release the steering wheel lock, when the fingerprint reader 24 detects the fingerprint.

Such changes and modifications are to be understood as being within the scope of the present invention as defined by the appended claims.

What is claimed is:

1. A security system for a vehicle, comprising:
   a navigation apparatus having a display for displaying a message on a predetermined region of its screen upon being powered on, the message leading a driver of the vehicle to unwittingly touch the predetermined region of the screen with a finger, whereby a biometric characteristic of the finger can be detected without being noticed by the driver;
   detection means for detecting the biometric characteristic of the finger touching the predetermined region of the screen and for outputting first biometric data corresponding to the detected biometric characteristic;
   switch means that has a first state for allowing operation of the vehicle and a second state for prohibiting the operation of the vehicle; and
   control means for keeping the switch means in the second state until receiving the first biometric data from the detection means, the control means changing the switch means to the first state upon receiving the first biometric data from the detection means, wherein
   the biometric characteristic is a fingerprint, and
   the message relates to product liability law.

2. The security system according to claim 1, further comprising:
   input means for inputting enable and disable commands to the control means, wherein
   the detection means has an enable mode where the detection means is enabled and a disable mode where the detection means is disabled, and
   the control means switches the detection means to the enable mode in response to the enable command and switches the detection means to the disable mode in response to the disable command.

3. The security system according to claim 2, wherein
   the input means is displayed on the screen to be operable by the driver so that the driver can input the enable and disable commands to the control means using the input means.

4. The security system according to claim 2, wherein
   the enable and disable commands are provided from outside the vehicle, and
   the input means includes first receiving means for receiving the enable and disable commands.

5. The security system according to claim 1, further comprising:
   a nonvolatile memory, wherein
   the control means stores the first biometric data in the nonvolatile memory.

6. The security system according to claim 1, wherein
   the control means converts the first biometric data to second biometric data having a data format used in a predetermined fingerprint matching process.

7. The security system according to claim 6, further comprising:
transmitting means for transmitting at least one of the first and second biometric data to a predetermined destination in accordance with a first transmission command, wherein
the control means outputs the first transmission command to the transmitting means.

8. The security system according to claim 7, further comprising:
second receiving means for receiving a second transmission command from outside the vehicle and for outputting the first transmission command to the control means in accordance with the second transmission command.

9. The security system according to claim 7, wherein
the control means outputs the first transmission command to the transmitting means only when a predetermined condition is met.

10. The security system according to claim 7, further comprising:
a fingerprint database for containing third biometric data of at least one driver who is authorized to drive the vehicle, wherein
the control means checks the first biometric data against the third biometric data and outputs the first transmission command to the transmitting means only when the first biometric data is different from the third biometric data.

11. The security system according to claim 10, wherein
the control means adds alarm data to the at least one of the first and second biometric data when the first biometric data is different from the third biometric data, and
the alarm data indicates that the at least one of the first and second biometric data is different from the third biometric data.

12. The security system according to claim 7, further comprising:
a fingerprint database for containing third biometric data corresponding to the biometric characteristic of the finger of at least one person who is authorized to drive the vehicle, wherein
the control means checks the second biometric data against the third biometric data and outputs the first transmission command to the transmitting means only when the second biometric data is different from the third biometric data.

13. The security system according to claim 12, wherein
the control means adds alarm data to the at least one of the first and second biometric data when the second biometric data is different from the third biometric data, and
the alarm data indicates that the at least one of the first and second biometric data is different from the third biometric data.

14. The security system according to claim 1, wherein
the message says, "This navigation apparatus may have a distance error. Please touch here, if you accept the error."

* * * * *